3,676,284
REINFORCED FOAM POLYSTYRENE LAMINATE
Elizabeth Blommers, Monroeville, Pa., assignor to Koppers Company, Inc.
No Drawing. Filed Mar. 2, 1971, Ser. No. 120,322
Int. Cl. B32b 5/18, 17/10
U.S. Cl. 161—93          10 Claims

ABSTRACT OF THE DISCLOSURE

A reinforced foamed polystyrene laminate comprising a first layer of foamed polystyrene, a second layer of glass cloth, and an adhesive layer formed from (a) a resin mixture of a phenol resorcinol-formaldehyde resin and a polysulfide resin, and (b) a hardener for the resin mixture. The adhesive layer adhesively joins the polystyrene layer to the secondary layer. The resin mixture and hardener can also be used as a coating for foamed polystyrene.

BACKGROUND OF THE INVENTION

This invention relates to foamed polystyrene and to a method of contacting foamed polystyrene with liquid organic materials. More particularly, this invention relates to the use of particular organic materials for adhesively joining foamed polystyrene to a facing material to form a reinforced laminate, and to the use of the organic materials to form an organic coating for foamed polystyrene.

Foamed polystyrene is an excellent lightweight structural and insulating material and is used in many applications requiring such a lightweight material. For example, it has been previously used as a structural material for making sailboats, as a material for making plastic drinknig cups, and for many other applications. It is often desirable to adhesively join foamed polystyrene to a facing material to provide a foamed polystyrene laminate that has characteristics which are superior to a single layer of foamed polystyrene. For example, it is often necessary to join foamed polystyrene to a reinforcing facing material to increase the strength of foamed polystyrene products.

The selection of a suitable adhesive for joining foamed polystyrene to facing materials has, however, presented many problems. Foamed polystyrene has a cell structure which is easily collapsed by the organic solvents used in most conventional adhesives. The susceptibility of foamed polystyrene to attack by organic solvents makes it extremely difficult to adhesively bind foamed polystyrene to other material such as reinforcing material. In fact, this susceptibility also makes it difficult to bond one layer of foamed polystyrene to another layer of foamed polystyrene.

In the past, specially prepared adhesives such as epoxy glues have been successfully used to join foamed polystyrene to other materials and to itself. These glues, however, are extremely expensive. Consequently, widespread use of these glues for low cost applications of foamed polystyrene is not feasible. It would be desirable, therefore, to provide an adhesive which does not attack and collapse the cell structure of foamed polystyrene.

In some applications, it is also desirable to coat foamed polystyrene to provide its surface with improved characteristics. Most conventional organic coating materials, however, also attack the cell structure of foamed polystyrene.

SUMMARY OF THE INVENTION

In accordance with this invention, a foamed polystyrene laminate is provided which comprises a first layer of foamed polystyrene, a second layer of facing material, and an adhesive for joining the foamed polystyrene layer to the second layer. The adhesive may comprise (a) a resin mixture comprising a phenol-resorcinol-formaldehyde resin and a polysulfide resin and (b) a hardener for the resin mixture.

The preferred resin mixture comprises from 10 to 20 parts by weight of a polysulfide resin and 80 to 90 parts by weight of a phenol-resorcinol-formaldehyde resin. The phenol-resorcinol-formaldehyde resin preferably comprises from about 50 to 80 moles of phenol and 20 to 50 moles of resorcinol per 100 moles of total phenol and resorcinol, and from about 0.55 to 0.75 mole of formaldehyde per mole of total phenol and resorcinol. The amount of hardener in the adhesive layer is sufficient to provide a total formaldehyde (including that initially condensed with the resin mixture) to total phenolic compound mole ratio of greater than 0.8:1 and preferably in the range of 1.1 to 1.4 moles of total formaldehyde to 1 mole of total phenol and resorcinol.

Surprisingly, it has been found that foamed polystyrene is not attacked by the phenol-resorcinal-formaldehyde and polysulfide resin mixture and that such a mixture can be used for adhesively bonding the foamed polystyrene to a layer of facing material without destroying the cell structure of the polystyrene. The facing materials preferably include metal, cement board, glass cloth, and foamed polystyrene.

It has been further found that the phenol-resorcinol-formaldehyde and polysulfide resin mixture and hardener can be used as a coating for foamed polystyrene to provide a protective coating and impact, and other characteristics.

It has been further found that the presence of a polysulfide resin in the phenol-resorcinol-formaldehyde resin mixture provides a tough, non-brittle coating as contrasted to the brittle coating formed by phenol-formaldehyde resins alone.

It is to be understood that both the foregoing general description and the following detailed description are exemplary and explanatory but are not restrictive of the invention.

BACKGROUND OF THE INVENTION

In accordance with the invention, a laminate is provided having a first layer of foamed polystyrene. The foamed polystyrene is preferably of the rigid type that is normally used as a structural material. Rigid foamed polystyrene finds extensive use for its thermal insulation and other properties in building construction sandwich panels, chemical equipment, refrigerators, air conditioners and the like applications. This material is prepared by conventional means such as by incorporating a blowing agent in polystyrene particles and compressing the particles under heat and pressure to form a polystyrene board. For use in the present invention the foamed polystyrene can also be of a semi-rigid or flexible nature and can be molded or extruded in any suitable manner.

The polystyrenes useful in the invention usually have a molecular weight between about 150,000 to 250,000, and can be prepared in thicknesses ranging from ⅟₁₆ to 96 inches, and densities between 0.5 to 5 lbs. per cubic foot. The polystyrene can be a homopolymer of styrene or substituted styrene monomers, or a copolymer of these monomers with monomers that are copolymerizable therewith, such as acrylonitrile, maleic anhydride, and butadiene. Also, the copolymers can be formed from mixtures of suitable styrene and substituted styrene monomers.

In accordance with the invention, the laminate contains a second layer of a facing material. As here embodied, the second layer can be a reinforcing material such as glass cloth, metal, cement board or other material to form foamed polystyrene structural laminates and can also be another layer of foamed polystyrene.

In accordance with the invention, an adhesive layer is formed from (a) a resin mixture of a phenol-resorcinol-formaldehyde resin and a polysulfide resin and (b) a hardener for the resin mixture. The adhesive layer adhesively joins the foamed polystyrene layer to the second layer of facing material.

As here embodied, the resin mixture comprises 10 to 50 parts by weight of a polysulfide resin and 50 to 90 parts by weight of a phenol-resorcinol-formaldehyde resin. Preferably, the resin mixtures contain 10 to 20 parts of the polysulfide resin and 80 to 90 parts of the phenol-resorcinol-formaldehyde resin.

Polysulfide resins are synthetic polymers obtained by the reaction of sodium polysulfide with organic dichlorides such as dichlorodiethyl formal, alone or mixed with ethylene dichloride. Polysulfide resins possess good resistance to light, oxygen, oils and organic solvents, are impermeable to gases; are flexible, and impart in some measure these properties to the adhesives useful in the present invention. They are obtainable in the form of liquids, dispersions, and millable or dry resins. Polysulfide resins useful in the present invention are liquids having a molecular weight from 1,000–4,000 and can be obtained from Thiokol Chemical Corporation under the trademark LP–2 or LP–33.

The phenol-resorcinol-formaldehyde resin comprises from about 50 to 80 moles of phenol and 20 to 50 moles of resorcinol per 100 moles of total phenol compound (moles of phenol plus moles of resorcinol), and from about 0.55 to 0.75 mole of formaldehyde per mole of total phenol and resorcinol. A preferred resin contains 70 moles of phenol and 30 moles of resorcinol per 100 moles of total phenol and resorcinol. The resin is water-soluble, fusible, and is conveniently prepared as an aqueous solution.

The phenol-resorcinol-formaldehyde resins are prepared by any of the methods well known to those skilled in the art. For example, the resin can be prepared by reacting phenol and all the formaldehyde in the presence of an alkali metal sulfide catalyst at an alkaline pH. Resorcinol is then added to the reaction mixture optionally in the presence of a metal hydroxide, e.g., calcium hydroxide, as a catalyst. Refluxing is continued until the resin has a constant viscosity of about 200 to 900 Gardner seconds.

To prepare the phenol-resorcinol-formaldehyde resin for use in adhesive formulations, the resin is diluted with water or with a water miscible solvent conventional in the adhesive art to give a solution having a solids content of about 40 to 60% by weight.

The polysulfide resin can be conveniently added to the phenol-resorcinol-formaldehyde resin before, during or after its dilution, but preferably is added after its dilution. Preferably, the liquid polysulfide resin is added slowly to the phenol-resorcinol resin with good stirring to provide a uniform resin mixture.

In accordance with the invention, the phenol-resorcinol-formaldehyde and polysulfide resin mixture is mixed with a methylene donor or hardener to formulate an adhesive mix. The hardener used is a conventional hardener for phenol condensate resins, such as an aldehyde, for example, aqueous formaldehyde, paraformaldehyde, or the like. Preferably, the hardener is paraformaldehyde or one of its higher molecular weight polymers exemplified by the formula $H(OCH_2)_nOH$, where $n$ is greater than 50, commonly referred to as alpha-polyoxymethylene and beta-polyoxymethylene. The higher polymers of paraformaldehyde are prepared by heating paraformaldehyde to a temperature of approximately 100° C., preferably in the presence of an acid catalyst, such as oxalic acid or a Lewis acid. The paraformaldehyde is used in particulate form, having a fine mesh size of at least 90% through 150 mesh, and preferably around 250 mesh.

The hardener is added to the resin solution in an amount sufficient to convert the resin mixture to a crosslinked, water-insoluble, infusible state, and to provide a total formaldehyde (including that initially condensed with the resin) to total phenolic compound mole ratio greater than 0.8:1. Preferably, the hardener and resin mixture together contain about 1.1 to 1.5 moles of total formaldehyde per mole of total phenol and resorcinol, and more preferably 1.05 to 1.30 moles of total formaldehyde per mole of total phenolic compound. Prior to the addition of the hardener, the pH of the resin mixture is adjusted to 7.5 to 8.5, preferably by the addition of 50% aqueous caustic. If the pH of the resin mixture is less than 7.5, rapid curing characteristics are not obtained, while if the pH if greater than 8.5, pot life is reduced.

The hardener is conveniently added to the resin mixture along with conventional extenders and fillers such as walnut shell flower, wood flower, and the like. The hardener can be added to the resin mixture as a powder consisting of a mixture of the selected methylene donor with the appropriate fillers, or can be added as a liquid hardener in which the selected methylene donor and fillers are mixed with a suitable liquid, such as a monohydric or polyhydric alcohol.

The adhesive mix formed by addition of the hardener with the resin mixture is then applied to the polystyrene layer. The pot life or gel time of the adhesives useful in the present invention can be varied by adjusting the formulation of the mix and/or its method of preparation in a manner conventional in the art. For example, the pot life may be extended to 2 hours, or shortened to 30 minutes. The pot life or gel time is the period of time for the adhesive to gel and determines the amount of time available for open and closed assembly of the members to be bonded. Generally, the adhesive mixes used in the present invention exhibit a pot life of about between 60 to 90 minutes and can thus be used in applications where either a short or long assembly time is required.

The adhesives used in the present invention exhibit a cure time of about between 20 to 30 hours at temperatures of 70 to 80° F. The curing time of a particular adhesive mix can be adjusted, if desired, by a suitable catalyst or modifier.

The adhesive mixes can be applied to the polystyrene layer by a variety of conventional adhesive laydown techniques. For example, the adhesive mix can be applied by brush, spray gun, spatula, sawtooth spreader, push box, notched trowel, paint roller, or caulking gun. The viscosity of the adhesive mix can be varied by adding more or less filler and various amounts of fiber flock to permit efficient application by any of the above techniques. The viscosity of the adhesive mixes is generally between 10 and 100 poises. The adhesive mixes can be first applied to either the foamed polystyrene layer or second layer, but preferably is initially applied to the polystyrene layer which is then joined to the second layer.

The adhesive mixes used in the present invention exhibit high strength, moisture resistance, resistance to a odor absorption and transmission, resistance to freezing temperatures, and long-time aging properties in the completed bond. The adhesives used in the present invention produce bonds that are strong enough to tear the polystyrene foam when peel forces are exerted. Contrary to prior adhesives, the adhesives used in this invention do not deteriorate the cells of foamed polystyrene foams by solvent action and are thus effective for use with foamed polystrene.

In addition to being used as an adhesive layer for joining foamed polystyrene directly to a second layer of facing material, the resin mixture and hardener can be applied to foamed polystyrene to serve as a coating for the polystyrene to improve the usefulness of the polystyrene. The resin mixture and hardener, upon crosslinking, form a protective coating layer for the foamed polystrene against cell destruction by organic solvent and improves the wear characteristics of the foamed polystyrene. The coated polystyrene can then, if desired, be joined to other materials with conventional adhesives, such as, for example, with polyester resin based adhesives.

In one embodiment of the present invention, a boat made of foamed polystyrene is provided with a reinforcing layer of glass cloth by using a phenol-resorcinol-formaldehyde and polysulfide resin mixture with a paraformaldehyde hardener as an adhesive to form laminate which has good weather resistance. The adhesive imparts a dark color to the laminate, and a conventional epoxy marine paint can be used to cover the dark color of the exposed surface. Exemplary of conventional marine paints normally used for this purpose are those obtainable under the trade name Polypoxy from Pettit Paint Co., Inc. If desired, the exposed surface of the glass cloth can also be coated with a layer of the phenol-resorcinol-formaldehyde and polysulfide adhesive before application of the machine paint to further improve the resistance of the laminate to the corrosive elements, such as, salt water and gasoline, that normally are encountered by boats.

The following example is given by way of illustration to further explain the principles of the invention. This example is merely illustrative and is not to be understood as limiting the scope and underlying principles of the invention in any way. All percentages and parts referred to herein are by weight unless otherwise specifically indicated.

EXAMPLE I

Ninety (90) parts of an aqueous phenol-resorcinol-formaldehyde resin solution having a mole ratio of 70 moles phenol to 30 moles resorcinol and 0.70 mole formaldehyde per mole of phenol and resorcinol, are mixed ten (10) parts of a polysulfide resin having a viscosity within around 100 poises (sold by Thiokol Chemical Corp. under the trade name LP-33).

Sixteen (16) parts of a filler mixture consisting of 7 parts of paraformaldehyde and 9 parts of wood flower filler in the form of a powder are added to the above resin mixture to form an adhesive mix. The gel time for the adhesive mix is found to be about 60 minutes at 73° F.

The adhesive mix is brushed onto the outer surface of a foamed polystyrene boat by using a paint brush. Glass cloth is then pressed onto the adhesive. The adhesive mix is then brushed onto the outer surface of the glass cloth. Cure of this assembly is found to occur in about 24 hours and after cure a marine epoxy paint is applied to the glass cloth. The adhesive bond produced using this adhesive is durable, water-proof, and resistant to attack by salf water and gasoline.

The invention in its broader aspects is not limited to the specific details shown and described and departures may be made from such details without departing from the invention and without sacrificing its chief advantages.

What is claimed is:

1. A foamed polystyrene laminate comprising a first layer of foamed polystyrene, a second layer of facing material, and an adhesive layer joining the first and second layer formed from (a) a resin mixture of a phenol-resorcinol-formaldehyde-resin and a polysulfide resin, and (b) a hardener for the resin mixture.

2. The laminate of claim 1 wherein said second layer is selected from the group consisting of glass cloth, foamed polystyrene, metal, or cement board.

3. The laminate of claim 1 wherein the hardener is paraformaldehyde.

4. The laminate of claim 1 wherein the resin mixture comprises from 10 to 50 parts by weight of polysulfide resin with 50 to 90 parts by weight of phenol-resorcinol-formaldehyde resin.

5. The laminate of claim 1 wherein the phenol-resorcinol-formaldehyde resin comprises 50 to 80 moles of phenol and 20 to 50 moles of resorcinol per 100 moles of phenol and resorcinol and from about 0.55 to 0.75 mole of formaldehyde per mole of phenol and resorcinol.

6. The laminate of claim 5 wherein the resin mixture and hardener provide a total formaldehyde to total phenol and resorcinol mole ratio of 0.85 to 1.5 moles of total formaldehyde per mole of total phenol and resorcinol.

7. The laminate of claim 6 wherein the resin mixture comprises 10 parts by weight of polysulfide resin and 90 parts by weight of phenol-resorcinol-formaldehyde together providing a total formaldehyde to total phenol and resorcinol mole ratio of 1.05 to 1.3 moles of total formaldehyde per mole of total phenol and resorcinol.

8. A foamed polystyrene laminate comprising a first layer of foamed polystyrene, a second layer of glass cloth, and an adhesive layer joining the first and second layer formed from:

(a) a resin mixture of 90 parts of weight of a phenol-resorchinol-formaldehyde resin and 10 parts by weight of a polysulfide resin and (b) a paraformaldehyde hardener for the resin mixture.

9. The laminate of claim 8 wherein the phenol-resorcinol-formaldehyde resin comprises 70 moles of phenol and 30 moles of resorcinol per 100 moles of total phenol and resorcinol, and 0.55 to 0.75 mole of formaldehyde per mole of total phenol and resorcinol.

10. The laminate of claim 9 wherein the resin mixture and paraformaldehyde provide a total formaldehyde to total phenol and resorcinol mole ratio of 1.05 to 1.3 moles of total formaldehyde per mole of total phenol and resorcinol.

References Cited

UNITED STATES PATENTS

| 3,352,812 | 11/1967 | Parham, Jr., et al. | 161—187 |
| 3,423,356 | 1/1969 | Smith et al. | 260—838 |
| 3,499,864 | 3/1970 | Millen | 260—838 |

WILLIAM J. VAN BALEN, Primary Examiner

U.S. Cl. X.R.

117—132 BF; 138.8 UA; 156—335; 161—187, 159, 160, 161, 257